United States Patent
Mandausch

(10) Patent No.: US 10,612,446 B2
(45) Date of Patent: Apr. 7, 2020

(54) METHOD FOR DETERMINING THE STATE OF LOADING OF A PARTICLE FILTER AND INTERNAL COMBUSTION ENGINE

(71) Applicant: Volkswagen Aktiengesellschaft, Wolfsburg (DE)

(72) Inventor: Michael Mandausch, Osloß (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 22 days.

(21) Appl. No.: 15/908,683

(22) Filed: Feb. 28, 2018

(65) Prior Publication Data

US 2018/0252140 A1  Sep. 6, 2018

(30) Foreign Application Priority Data

Mar. 3, 2017  (DE) .................... 10 2017 104 469

(51) Int. Cl.
*F02N 11/00*  (2006.01)
*F01N 3/021* (2006.01)
(Continued)

(52) U.S. Cl.
CPC .............. *F01N 11/00* (2013.01); *F01N 3/021* (2013.01); *F01N 5/00* (2013.01); *F01N 9/002* (2013.01);
(Continued)

(58) Field of Classification Search
CPC . F01N 11/00; F01N 3/021; F01N 5/00; F01N 9/002; F01N 2260/04;
(Continued)

(56) References Cited

U.S. PATENT DOCUMENTS 5,440,879 A * 8/1995 Dellora .................. F02B 37/22
                                                       60/602
5,511,413 A    4/1996 Pfister
(Continued)

FOREIGN PATENT DOCUMENTS

CN        202073649 U    12/2011
CN        102782293 A    11/2012
(Continued)

OTHER PUBLICATIONS

Extended European Search Report issued by the European Patent Office for European Application No. 18 159 032.4, dated Apr. 18, 2018, accompanied by an opinion on whether the requirements of the European Patent Convention are met.
(Continued)

*Primary Examiner* — Brandon D Lee
(74) *Attorney, Agent, or Firm* — Manfred Beck, P.A.

(57) ABSTRACT

A method for determining the state of loading of a particle filter in an exhaust system of a turbocharged internal combustion engine is provided. To determine the state of loading, a position of a control mechanism of the turbine of the exhaust turbocharger is detected and compared with the position during operation of the internal combustion engine with the same operating parameters with the particle filter unladen. An air mass meter is provided in order to be able to distinguish a change in the pressure situation at the turbine of the exhaust turbocharger due to a rise in the exhaust gas backpressure owing to increasing loading of the particle filter from a change in the pressure situation owing to leakage of the air supply system. An internal combustion engine having a control unit which is configured to carry out such a method is also provided.

7 Claims, 2 Drawing Sheets

(51) Int. Cl.
*F01N 9/00* (2006.01)
*F01N 5/00* (2006.01)
*F02B 37/18* (2006.01)
*F02B 37/24* (2006.01)
*F02M 35/10* (2006.01)
*F02D 41/00* (2006.01)
*F02B 37/12* (2006.01)
*F01N 11/00* (2006.01)

(52) U.S. Cl.
CPC ............ *F02B 37/183* (2013.01); *F02B 37/24* (2013.01); *F02M 35/10386* (2013.01); *F01N 2260/04* (2013.01); *F01N 2550/02* (2013.01); *F01N 2550/04* (2013.01); *F01N 2560/07* (2013.01); *F01N 2560/08* (2013.01); *F01N 2900/08* (2013.01); *F01N 2900/1406* (2013.01); *F01N 2900/1606* (2013.01); *F02B 2037/122* (2013.01); *F02D 41/0007* (2013.01); *F02D 2200/0812* (2013.01); *Y02T 10/144* (2013.01); *Y02T 10/20* (2013.01); *Y02T 10/47* (2013.01)

(58) Field of Classification Search
CPC ............ F01N 2550/02; F01N 2550/04; F01N 2560/07; F01N 2560/08; F01N 2900/08; F01N 2900/1406; F01N 2900/1606; F02B 37/183; F02B 37/24; F02B 2037/122; F02M 35/10386; F02D 2200/0812; F02D 41/0007; Y02T 10/144; Y02T 10/20; Y02T 10/47

See application file for complete search history.

(56) References Cited

U.S. PATENT DOCUMENTS

| | | | |
|---|---|---|---|
| 6,397,587 B1* | 6/2002 | Van Nieuwstadt | F01N 9/002 60/274 |
| 2003/0177765 A1* | 9/2003 | Wang | F02B 37/24 60/602 |
| 2009/0183499 A1 | 7/2009 | Boorse | |
| 2009/0277431 A1 | 11/2009 | Nitzke et al. | |
| 2011/0146269 A1 | 6/2011 | Hepburn et al. | |
| 2013/0098033 A1 | 4/2013 | Murakami et al. | |
| 2014/0000239 A1 | 1/2014 | Swoish et al. | |
| 2014/0251146 A1* | 9/2014 | Noguchi | F02D 41/029 96/397 |
| 2014/0338434 A1 | 11/2014 | Sun et al. | |
| 2018/0094565 A1 | 4/2018 | Dingl et al. | |

FOREIGN PATENT DOCUMENTS

| | | |
|---|---|---|
| CN | 103987930 A | 8/2014 |
| DE | 19651177 A1 | 6/1998 |
| DE | 101 40 048 A1 | 4/2002 |
| DE | 601 09 514 T2 | 7/2005 |
| DE | 10 2006 054 043 A1 | 5/2008 |
| DE | 10 2009 004 416 A1 | 7/2010 |
| DE | 10 2013 211 781 A1 | 1/2014 |
| DE | 10 2015 211 151 A1 | 12/2016 |
| WO | 2009/017566 A1 | 2/2009 |

OTHER PUBLICATIONS

Search Report including Provisional Assessment of Patentability issued by the German Patent and Trademark Office for German Patent Application No. DE 10 2017 104 469.8 dated Nov. 9, 2017.
Search Report and translation thereof, dated Nov. 15, 2019, issued by the National Intellectual Property Administration, People's Republic of China for Chinese Patent Application No. 201810174739.2 which is related to U.S. Appl. No. 15/908,683.
Office Action and machine translation thereof, dated Nov. 26, 2019, issued by the State Intellectual Property Office of People's Republic of China for Chinese Patent Application No. 201810174739.2 which is related to U.S. Appl. No. 15/908,683.

* cited by examiner

METHOD FOR DETERMINING THE STATE OF LOADING OF A PARTICLE FILTER AND INTERNAL COMBUSTION ENGINE

CROSS-REFERENCE TO RELATED APPLICATIONS

This application claims the priority, under 35 U.S.C. § 119, of German Patent Application No. DE 10 2017 104 469.8, filed Mar. 3, 2017; the prior application is herewith incorporated by reference in its entirety.

BACKGROUND OF THE INVENTION

Field of the Invention

The invention relates to a method for determining the state of loading of a particle filter disposed in an exhaust system of an internal combustion engine and to an internal combustion engine having an exhaust turbocharger and a particle filter disposed in the exhaust system.

Current exhaust emissions legislation and increasingly strict exhaust emissions legislation in the future make severe demands on untreated emissions from engines and on the exhaust gas aftertreatment of internal combustion engines. In the case of diesel engines, a particle filter for retaining the soot particles formed during combustion in the engine has been standard equipment for many years and is currently used on almost all diesel engines for exhaust gas aftertreatment. With the introduction of the EU6 (Euro 6) exhaust standard for spark ignition engines, a limit for particle emissions is prescribed, and therefore the use of a particle filter may be necessary with spark ignition engines as well. While a motor vehicle is being driven, the particle filter is loaded with particles, and the exhaust gas backpressure in the exhaust duct increases with loading. This loading of the particle filter can be determined in a control unit of the internal combustion engine by differential pressure measurement in the exhaust duct before and after the particle filter or by modeling, for example. To ensure that the exhaust gas backpressure level does not rise too far, the particle filter must be continuously or periodically regenerated. To carry out thermal oxidation of the soot particles on the particle filter with oxygen, an adequate regeneration temperature and the simultaneous presence of residual oxygen in the exhaust gas is necessary. In the case of internal combustion engines which have an exhaust turbocharger, the increase in the exhaust gas backpressure due to the soot particles retained in the particle filter leads to a decrease in the pressure drop across the turbine of the exhaust turbocharger and thus to a decrease in the possible turbine power. Since the turbine and the compressor of the exhaust turbocharger are mechanically coupled, the possible compressor pressure ratio consequently also falls. The compressor can no longer make available the required boost pressure. For this reason, exhaust turbochargers have control devices such as a wastegate valve and/or variable turbine geometry, which can be adjusted through the use of an actuator. With the aid of the actuator, the position of the control device can be changed, thereby making is possible to directly influence the turbine power.

German Patent Document DE 601 09 514 T2 discloses a device for regenerating a particle filter in the exhaust duct of a diesel engine. In this case, different information, which is associated with different operating parameters of the internal combustion engine and with elements connected thereto, is evaluated. Regeneration of the particle filter is initiated when there is a corresponding differential pressure prevailing across the particle filter, and, to initiate the regeneration phase of the particle filter, a multiple injection of fuel into the combustion chambers of the diesel engine takes place to raise the exhaust gas temperature to a temperature required to regenerate the particle filter.

German Patent Application Publication No. DE 10 2006 054 043 A1 discloses a diesel engine which has an exhaust turbocharger disposed in the exhaust duct of the diesel engine and a particle filter, wherein the exhaust turbocharger drives a compressor disposed in the fresh air system of the internal combustion engine, upstream of a charge air cooler, wherein the internal combustion engine has a low-pressure exhaust gas recirculation system which removes exhaust gas from the exhaust duct downstream of the turbine of the exhaust turbocharger and feeds it to the fresh air system upstream of the compressor. In order to control the exhaust gas recirculation, an exhaust gas recirculation valve controlled through the use of a differential pressure sensor is disposed in the low-pressure exhaust gas recirculation system.

German Patent Application Publication No. DE 10 2009 004 416 A1 discloses a method for operating components for exhaust gas aftertreatment which are disposed in the exhaust tract of an internal combustion engine pressure-charged by an exhaust turbocharger. To increase the temperature in this case, the exhaust gas flow upstream of the turbine is divided into a first partial flow and a second partial flow, and both partial flows are fed to the exhaust gas aftertreatment component, in particular a particle filter. In order, in the case of there being a plurality of exhaust gas aftertreatment components disposed in the exhaust tract, to supply each component with a flow at a temperature which is as favorable as possible for the respective exhaust gas aftertreatment step, the division of the partial flows is appropriately controlled.

SUMMARY OF THE INVENTION

It is accordingly an object of the invention to provide a method for determining the state of loading of a particle filter and an internal combustion engine which overcome disadvantages of the heretofore-known methods and devices of this general type. It is in particular an object of the invention to detect a state of loading of the particle filter by using already existing sensors and thus to enable a particularly low cost and reliable determination of the state of loading of the particle filter in an alternative way.

With the foregoing and other objects in view there is provided, in accordance with the invention, a method for determining a state of loading of a particle filter, the method including:

providing the particle filter in an exhaust system of an internal combustion engine, wherein the internal combustion engine is pressure-charged by an exhaust turbocharger, and wherein a control device for determining a position of a control mechanism of a turbine of the exhaust turbocharger or a speed sensor for determining a rotational speed of the turbine of the exhaust turbocharger is disposed at the turbine of the exhaust turbocharger;

determining a position of the control device or a rotational speed of the turbine of the exhaust turbocharger;

comparing a determined position of the control device or a determined rotational speed of the turbine of the exhaust turbocharger with a position of the control device or a rotational speed of the turbine of the exhaust turbocharger in a same operating state and with the particle filter unladen; and calculating the state of loading of the particle filter from the determined position of the control device or the determined rotational speed of the turbine of the exhaust turbocharger.

In other words, the object of the invention is achieved by a method for determining the state of loading of a particle filter disposed in an exhaust system of an internal combustion engine pressure-charged through the use of an exhaust turbocharger, wherein a control device for determining the position of a control mechanism of a turbine of the exhaust turbocharger or a speed sensor for determining the rotational speed of the turbine is disposed at the turbine, wherein the method includes the steps of:

determining a position of the control device or a rotational speed of the turbine;

comparing the determined position of the control device or the determined rotational speed with a position of the control device or the rotational speed in the same operating state and with the particle filter unladen; and calculating the state of loading of the particle filter from the determined position of the control device or the rotational speed of the turbine.

By using the method according to the invention it is possible to determine the state of loading of the particle filter in the case of an internal combustion engine pressure-charged by a turbocharger. In this case, it is possible to dispense with an additional sensor system at the particle filter, in particular with a differential pressure measuring device or a radio-frequency sensor, and thus to save costs. Moreover, there is no need for complex wiring to the pressure sensors or the radiofrequency sensor. Furthermore, it is possible to dispense with a complex diagnostic concept for the sensors.

Advantageous developments and improvements of the method indicated in the independent claim for determining the state of loading of the particle filter are possible by using the features presented in the dependent claims.

In a preferred embodiment of the invention, it is envisaged that an air mass meter is disposed in an air supply system of the internal combustion engine, wherein a fresh air flow is additionally determined, and the determined fresh air flow is additionally included in the calculation of the state of loading of the particle filter. Through the additional evaluation of a signal of the air mass meter in the air supply system of the internal combustion engine, it is possible to ascertain whether an adjustment of the control device is in fact attributable to a rise in the exhaust gas backpressure owing to an increasing loading of the particle filter with soot particles or whether this adjustment is the result of leakage in the fresh air line and a corresponding pressure drop on the fresh air side. It is thus possible to distinguish between an adjustment due to leakage and an adjustment corresponding to the basic concept of the invention due to increasing loading of the particle filter. On board diagnosis is thus possible, allowing a malfunction to be excluded. In addition, it is possible to detect the charging of the combustion chambers of the internal combustion engine through the use of the air mass meter, thereby allowing more precise metering of the fuel and lower untreated emissions during combustion.

A particularly preferred option here is where the fresh air flow in the air supply system is determined upstream of a compressor of the exhaust turbocharger. A particularly simple and accurate determination of the fresh air flow is possible upstream of the compressor. In this case, the air mass meter, in particular a hot-film air mass meter, can be disposed as a separate component on an intake duct of the air supply system or can be integrated into an air filter. In principle, determination of the fresh air flow downstream of the compressor is also possible but this is rather unfavorable and reduces the accuracy of measurement owing to the turbulence which occurs during the compression of the air.

In another preferred embodiment of the invention, it is envisaged that the control device includes a wastegate valve, wherein the position of the wastegate valve is detected in order to determine the state of loading of the particle filter. As the loading of the particle filter increases, the exhaust gas backpressure in the exhaust system rises. This pressure rise is compensated by closing the wastegate valve in order to direct a larger exhaust gas mass flow via the turbine of the exhaust turbocharger. The exhaust gas mass flow via the wastegate falls. Thus, the pressure level in the exhaust system upstream of the turbine is raised. The pressure drop across the turbine increases, as a result of which the turbine power rises again to the level which the turbine was achieving before the adjustment of the wastegate valve when the particle filter was unladen and the exhaust gas backpressure was lower. From the position of the wastegate valve, it is thus possible to infer the loading of the particle filter without the need for additional differential pressure measurement across the particle filter.

As an alternative or in addition, it is envisaged in an advantageous development of the method that the turbine of the exhaust turbocharger is assigned adjustable guide vanes, wherein the loading of the particle filter is determined from a position of the guide vanes. By adjustment of the guide vanes of an exhaust turbocharger with variable turbine geometry (also referred to as a VTG charger), it is possible, in a similar manner to that involving closing the wastegate valve, to adapt the pressure ratio across the turbine of the exhaust turbocharger in such a way that the power loss due to the rise in the exhaust gas backpressure owing to the increasing particle filter loading is compensated. In this case, it is possible to infer a state of loading of the particle filter from the position of the guide vanes without the need for an additional differential pressure measurement across the particle filter.

According to an advantageous improvement of the method, it is envisaged that the loading of the particle filter is determined from the position of the wastegate valve and the position of the guide vanes. Evaluation of the position of the wastegate valve and the position of the guide vanes of the turbine gives rise to a redundancy, which can also be used as a diagnostic function for the respective other component. Moreover, the evaluation of two signals makes it possible to improve the accuracy of measurement and thus allows a more precise determination of the state of loading of the particle filter.

In an alternative embodiment of the method, provision is advantageously made for a speed sensor to be disposed on the turbocharger, in particular at the turbine of the turbocharger, wherein the loading of the particle filter is determined from the rotational speed of the exhaust turbocharger. In order to achieve the same compressor power of the exhaust turbocharger when the exhaust gas backpressure rises owing to the increasing soot loading of the particle filter, the rotational speed of the exhaust turbocharger rises relative to the same operating state with an unladen particle filter and a lower exhaust gas backpressure. The signal of the speed sensor and the exhaust turbocharger rotational speed determined therefrom can thus be used to infer a state of loading of the particle filter.

As a supplementary measure, provision is advantageously made for a pressure difference across the compressor of the exhaust turbocharger to be measured. Owing to the prevailing temperatures and owing to the, in general, significantly shorter line lengths for the sensors on the fresh air side, a differential pressure measurement across the compressor of the exhaust turbocharger can be used to detect a possible leakage in the air supply system. Here, both a leakage upstream of the compressor and a leakage downstream of the compressor lead to a change in the pressure ratio across the compressor, and therefore it is possible to infer a leakage from an unexpected change in this pressure ratio. Moreover, feedforward control of the air mass flow on the fresh gas side of the internal combustion engine can be performed using the pressure ratio across the compressor, thereby making possible an improved quantity control of the combustion air ratio for the combustion chambers and the associated lower untreated emissions.

According to another improvement of the method, it is envisaged that the control device of the turbine is adjusted by an actuator, in particular by an electric servomotor. In order to achieve a corresponding adaptation of the compressor power of the exhaust turbocharger, a corresponding adjustment of the control device is necessary, as described above. Through the use of an actuator, it is possible in a simple manner for the position of a closing member of the wastegate valve, in particular of a flap or butterfly valve, to be changed and a position signal to be transmitted electronically to a control unit of the internal combustion engine. As an alternative, it is possible to use an actuator to adjust the guide vanes of the adjustable guide vanes of the turbocharger. An electric servomotor is a small and compact actuator which is particularly suitable for the above-described requirements for the adjustment of the control device.

With the objects of the invention in view there is also provided an internal combustion engine, including:

an air supply system;
an exhaust system;
combustion chambers;
an exhaust turbocharger having a compressor disposed in the air supply system and having a turbine disposed in the exhaust system, the turbine driving the compressor in order to compress fresh air fed to the combustion chambers;
a particle filter disposed in the exhaust system downstream of the turbine of the exhaust turbocharger;
a control device for determining a position of a control mechanism of the turbine or a rotational speed of a speed sensor of the turbine, the control device being disposed at the turbine; and
a control unit configured to execute a machine-readable program code such that the control unit is configured to compare a determined position of the control device or a determined rotational speed of the turbine with a position of the control device or a rotational speed of the turbine in a same operating state and with the particle filter unladen, and such that the control unit is configured to calculate a state of loading of the particle filter from the determined position of the control device or the determined rotational speed of the turbine.

In other words, according to the invention, there is provided an internal combustion engine having an air supply system and an exhaust system, wherein the internal combustion engine is assigned an exhaust turbocharger having a compressor disposed in the air supply system and having a turbine, which is disposed in the exhaust system and which drives the compressor in order to compress the fresh air fed to the combustion chambers of the internal combustion engine, wherein a particle filter is disposed in the exhaust system downstream of a turbine of the exhaust turbocharger, wherein a control device for determining the position of a control mechanism of a turbine of the exhaust turbocharger or the rotational speed of a speed sensor of the turbine is disposed at the turbine and wherein the internal combustion engine is assigned a control unit, which carries out a method according to the invention when a machine-readable program code is executed on the control unit. In the case of an internal combustion engine according to the invention, it is possible to dispense with an additional sensor system on the particle filter, as a result of which fewer components are required and costs can be reduced.

According to another feature of the invention, the internal combustion engine includes an air mass meter disposed in the air supply system; and the control unit is configured to additionally include a determined fresh air flow in a calculation of the state of loading of the particle filter. According to a further feature of the invention, the air mass meter is disposed upstream of the compressor.

Unless stated otherwise in individual cases, the various embodiments of the invention which are mentioned in this application can advantageously be combined with one another.

Although the invention is illustrated and described herein as embodied in a method for determining the state of loading of a particle filter and embodied in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
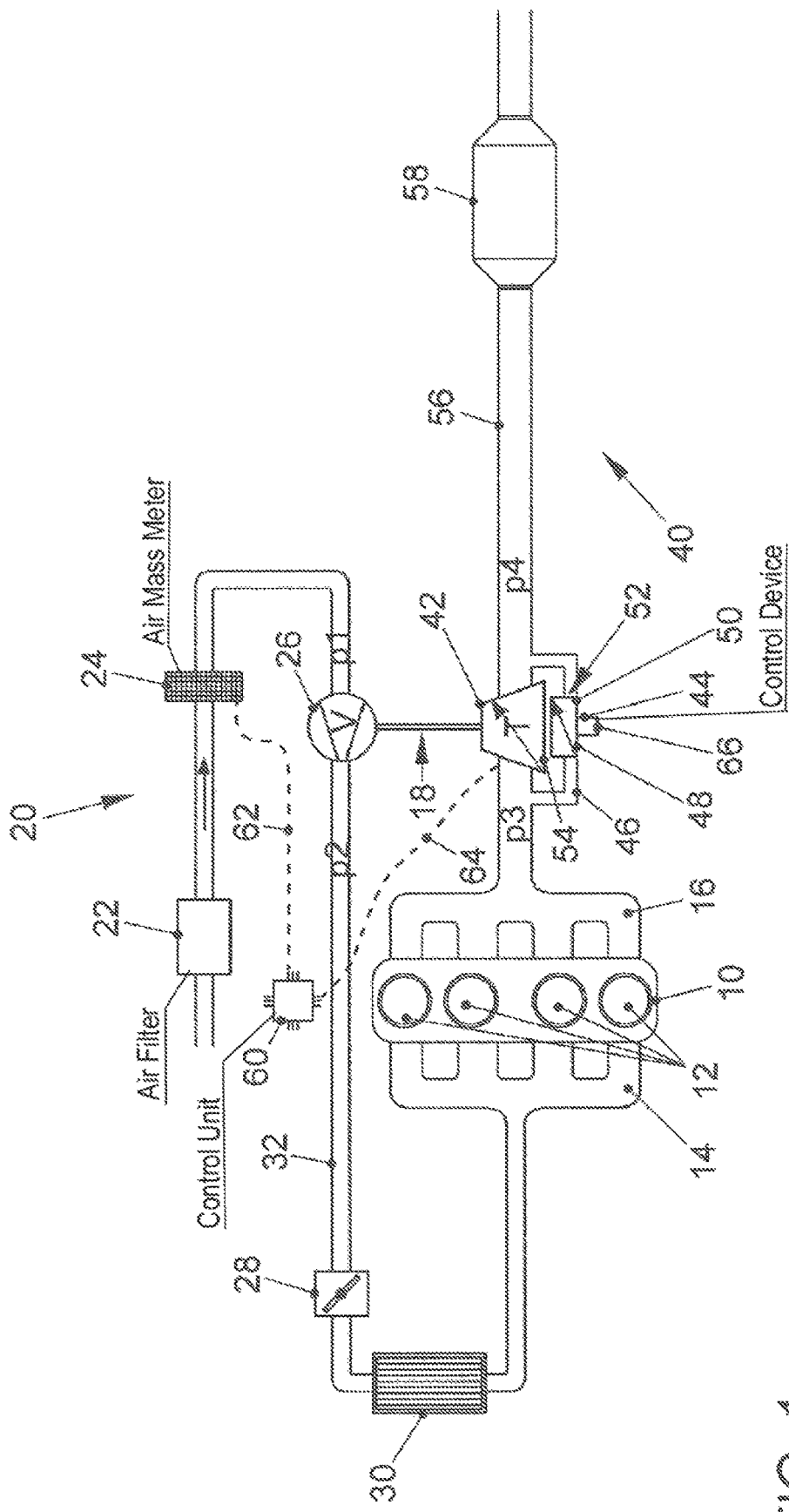
FIG. 1 is a diagrammatic view of a motor vehicle having an internal combustion engine which is pressure-charged by an exhaust turbocharger and which is configured to carry out a method according to the invention.

Referring now to the figures of the drawings in detail and first, particularly, to FIG. 1 thereof, there is shown an internal combustion engine 10 for a motor vehicle. The internal combustion engine 10 has combustion chambers 12, in which a fuel-air mixture is burned. The internal combustion engine 10 is connected by an inlet 14 to an air supply system 20 of the internal combustion engine 10. In the direction of flow of fresh air through a fresh air line 32 of the air supply system 20, the air supply system 20 includes an air filter 22 and, downstream of the air filter 22, an air mass meter 24, preferably a hot-film air mass meter. Disposed in the fresh air line downstream of the air mass meter 24 is the compressor 26 of the exhaust turbocharger 18, by means of which the fresh air is compressed to improve charging of the combustion chambers 12. A throttle valve 28 for controlling the air quantity fed to the combustion chambers is disposed downstream of the compressor 26. A charge air cooler 30 is disposed further downstream in the fresh air line 32, between the throttle valve 28 and the inlet 14 of the internal combustion engine 10, to cool the compressed air of the compressor 26 and further improve the charging of the combustion chambers of the internal combustion engine 10.

The internal combustion engine 10 is connected via an outlet 16 to an exhaust system 40 of the internal combustion engine 10. In the direction of flow of an exhaust gas of the internal combustion engine 10 through an exhaust duct 56 of the exhaust system, the exhaust system 40 has a turbine 42 of the exhaust turbocharger 18, which is rigidly coupled to the compressor 26 by a common shaft and drives the compressor 26. The exhaust turbocharger 18 has a wastegate 46, by means of which a partial flow of the exhaust gas can be routed past the turbine 42 of the exhaust turbocharger 18. Disposed in the wastegate 46 is a wastegate valve 48, by means of which the exhaust gas quantity flowing past the turbine 42 through the wastegate 46 can be controlled. The turbine 42 is preferably embodied as a turbine 42 with adjustable guide vanes 52. Disposed at the turbine 42 is a speed sensor 54, by means of which a rotational speed of the exhaust turbocharger 18 can be determined. Also provided at the turbine 42 of the exhaust turbocharger is at least one control device 44 (regulating device), by means of which the position of the wastegate valve 48 and/or the position of the adjustable guide vanes 52 can be changed. The control device 44 includes an actuator 50, in particular an electric servomotor 66, for changing the position of the guide vanes 52 and/or for opening and closing the wastegate valve 48. Disposed in the exhaust system 40 downstream of the turbine 42 is a particle filter 58, which filters the soot particles formed during the combustion of the fuel-air mixture in the combustion chambers 12 of the internal combustion engine 10 out of the exhaust gas flow of the internal combustion engine 10.

The internal combustion engine 10 is assigned a control unit 60, which controls the fuel quantity introduced into the combustion chambers 12 of the internal combustion engine 10. The control unit 60 is connected by a first signal line 62 to the air mass meter 24 and by a second signal line to the control device 44 of the exhaust turbocharger 18.

During the operation of the internal combustion engine 10, the particle filter 58 in the exhaust system 40 is loaded with soot particles and ash. During this process, the exhaust gas backpressure p4 in the exhaust system 40 downstream of the turbine 42 rises. Owing to the rise in the exhaust gas backpressure p4, the pressure gradient p3/p4 across the turbine 42 and thus the possible turbine power decreases. Since the turbine 42 and the compressor 26 of the exhaust turbocharger 18 are coupled mechanically by a shaft, the possible compressor pressure ratio p2/p1 also falls as a result. The compressor 26 can no longer make available the required boost pressure p2, and the maximum power of the internal combustion engine 10 thus also falls. For this reason, exhaust turbochargers 18 have control devices 44, in particular a wastegate valve 48 or adjustable guide vanes 52. With the aid of the actuator 50, the position of the control device 44 can be changed, thereby making it possible to directly influence the turbine power of the exhaust turbocharger 18.

In the case of an exhaust turbocharger 18 having a wastegate 46, the power loss owing to the rise in the exhaust gas backpressure p4 due to increasing loading of the particle filter 58 can be compensated by closing the wastegate valve 48. Closing the wastegate valve causes a larger exhaust gas mass flow to be passed via the turbine 42. The exhaust gas mass flow via the wastegate 46 falls. Thus, the exhaust gas pressure p3 ahead of the turbine 42 rises. The pressure gradient p3/p4 across the turbine 42 rises, as a result of which the turbine power increases once again to the level of an unladen particle filter 58. The boost pressure can then be reestablished since the compressor power also rises once again to the desired value along with the turbine power.

Modern exhaust turbochargers 18 have position feedback of the current position of the control device 44. If the position of the control device 44 with an unladen particle filter 58 is now compared with the position in the case of a laden particle filter 58, it can be seen that the position changes proportionally to the loading of the particle filter 58. As the loading increases, the wastegate valve 48 must be closed to an ever greater extent to enable the identical power to be provided. The necessary control ratio of the wastegate valve 48 or the difference between the duty factor with and without loading of the particle filter 58 is accordingly a measure of the pressure increase in the exhaust gas backpressure p4 and thus a measure of the loading of the particle filter 58.

Here, however, it is necessary to take account of the fact that leakage in the air supply system 20 downstream of the compressor 26 can result in an identical response of the control device 44. Owing to the additional leakage flow, the compressor power must be increased, but this is only possible if the turbine power is also increased. For this purpose, the wastegate valve 48 is closed to a further extent. In order to be able to distinguish between leakage in the air supply system 20 downstream of the compressor 26 and an increase in the exhaust gas backpressure downstream of the turbine 42 owing to increasing loading of the particle filter 58, an air mass meter 24 must be introduced in the system. The air mass meter 24 continuously measures the fresh air flow drawn in by the compressor 26. With the aid of the air mass meter 24, it is possible to detect an increase in the compressor volume flow due to leakage. By means of the air mass meter 24, it is possible to detect a deviation from the desired mass flow at any operating point. It is thus unambiguously clear whether this is a compressor volume increase owing to leakage or an increase in the exhaust gas backpressure owing to the increasing particle filter loading since the compressor volume flow drawn in by the compressor 26 does not increase in the event of an increase in the exhaust gas backpressure p4 owing to the increasing loading of the particle filter 58. This remains constant relative to the operating point.

Figure 2:
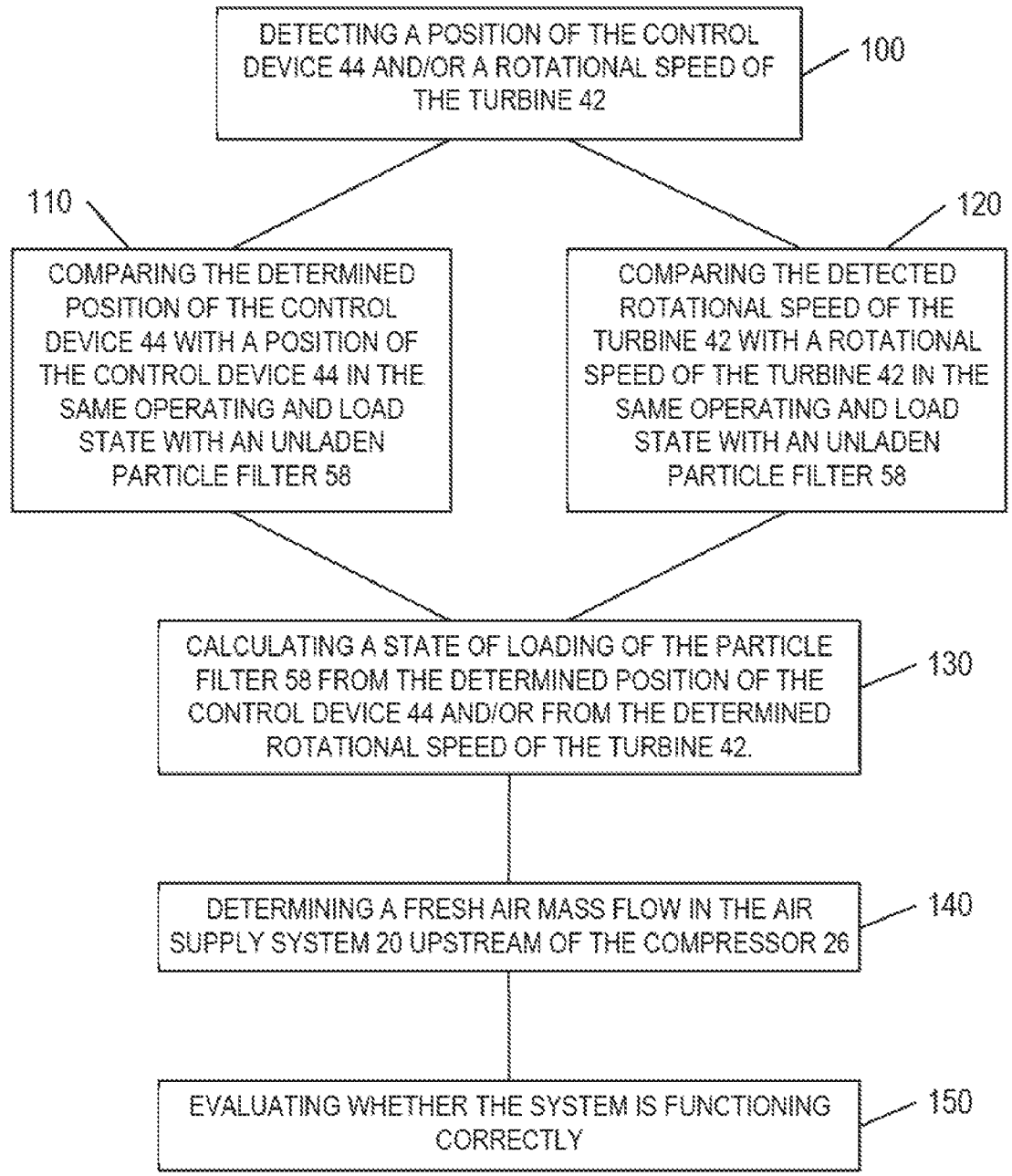
FIG. 2 is a flow diagram illustrating how a method according to the invention for determining the state of loading of a particle filter is carried out.

A flow diagram of a method according to the invention for determining the state of loading of the particle filter 58 is illustrated in FIG. 2. In a first method step 100, a position of the control device 44 and/or a rotational speed of the turbine 42 is detected. In a second, subsequent method step 110, the determined position of the control device 44 is compared with a position of the control device 44 in the same operating and load state with an unladen particle filter 58. As an alternative or in addition, the detected rotational speed of the turbine 42 is compared in a method step 120 with a rotational speed of the turbine 42 in the same operating and load state with an unladen particle filter 58. In a method step 130, a state of loading of the particle filter 58 is calculated from the determined position of the control device 44 and/or from the determined rotational speed of the turbine 42. In a method step 140, a fresh air mass flow in the air supply system 20 upstream of the compressor 26 is determined. In a method step 150, an evaluation as to whether the system is functioning correctly or whether a fault, in particular leakage in the air supply system 20 downstream of the compressor 26, is present is then carried out on the basis of the determined position of the control device 44 and/or the rotational speed of the turbine 42 and of the determined fresh air mass flow.

LIST OF REFERENCE CHARACTERS 10 internal combustion engine
12 combustion chambers
14 inlet
16 outlet
18 exhaust turbocharger
20 air supply system
22 air filter
24 air mass meter
26 compressor
28 throttle valve
30 charge air cooler
32 fresh air line
40 exhaust system
42 turbine
44 control device
46 wastegate
48 wastegate valve
50 actuator
52 adjustable guide vanes
54 speed sensor
56 exhaust duct
58 particle filter
60 control unit
62 signal line
64 signal line
66 electric servomotor

What is claimed is:

1. A method for determining a state of loading of a particle filter, the method comprising:
  providing the particle filter in an exhaust system of an internal combustion engine, wherein the internal combustion engine is pressure-charged by an exhaust turbocharger, and wherein a speed sensor for determining a rotational speed of a turbine of the exhaust turbocharger is disposed at the turbine of the exhaust turbocharger;
  determining a rotational speed of the turbine of the exhaust turbocharger;
  comparing a determined rotational speed of the turbine of the exhaust turbocharger with a rotational speed of the turbine of the exhaust turbocharger in a same operating state and with the particle filter unladen; and
  calculating the state of loading of the particle filter from the determined rotational speed of the turbine of the exhaust turbocharger.

2. The method according to claim 1, which further comprises providing an air mass meter disposed in an air supply system of the internal combustion engine, determining a fresh air flow and including the fresh air flow in a calculation of the state of loading of the particle filter.

3. The method according to claim 2, wherein the fresh air flow in the air supply system is determined upstream of a compressor of the exhaust turbocharger.

4. An internal combustion engine, comprising:
  an air supply system;
  an exhaust system;
  combustion chambers;
  an exhaust turbocharger having a compressor disposed in said air supply system and having a turbine disposed in said exhaust system, said turbine driving said compressor in order to compress fresh air fed to said combustion chambers;
  a particle filter disposed in said exhaust system downstream of said turbine of said exhaust turbocharger;
  a speed sensor for determining a rotational speed of said turbine; and
  a control unit configured to execute a machine-readable program code such that said control unit is configured to compare a determined rotational speed of said turbine with a rotational speed of said turbine in a same operating state and with said particle filter unladen, and such that said control unit is configured to calculate a state of loading of said particle filter from the determined rotational speed of said turbine.

5. The internal combustion engine according to claim 4, further including:
  an air mass meter disposed in said air supply system; and
  said control unit being configured to additionally include a determined fresh air flow in a calculation of the state of loading of said particle filter.

6. The internal combustion engine according to claim 5, wherein said air mass meter is disposed upstream of said compressor.

7. The internal combustion engine according to claim 4, wherein said speed sensor is disposed on said exhaust turbocharger.

* * * * *